UNITED STATES PATENT OFFICE.

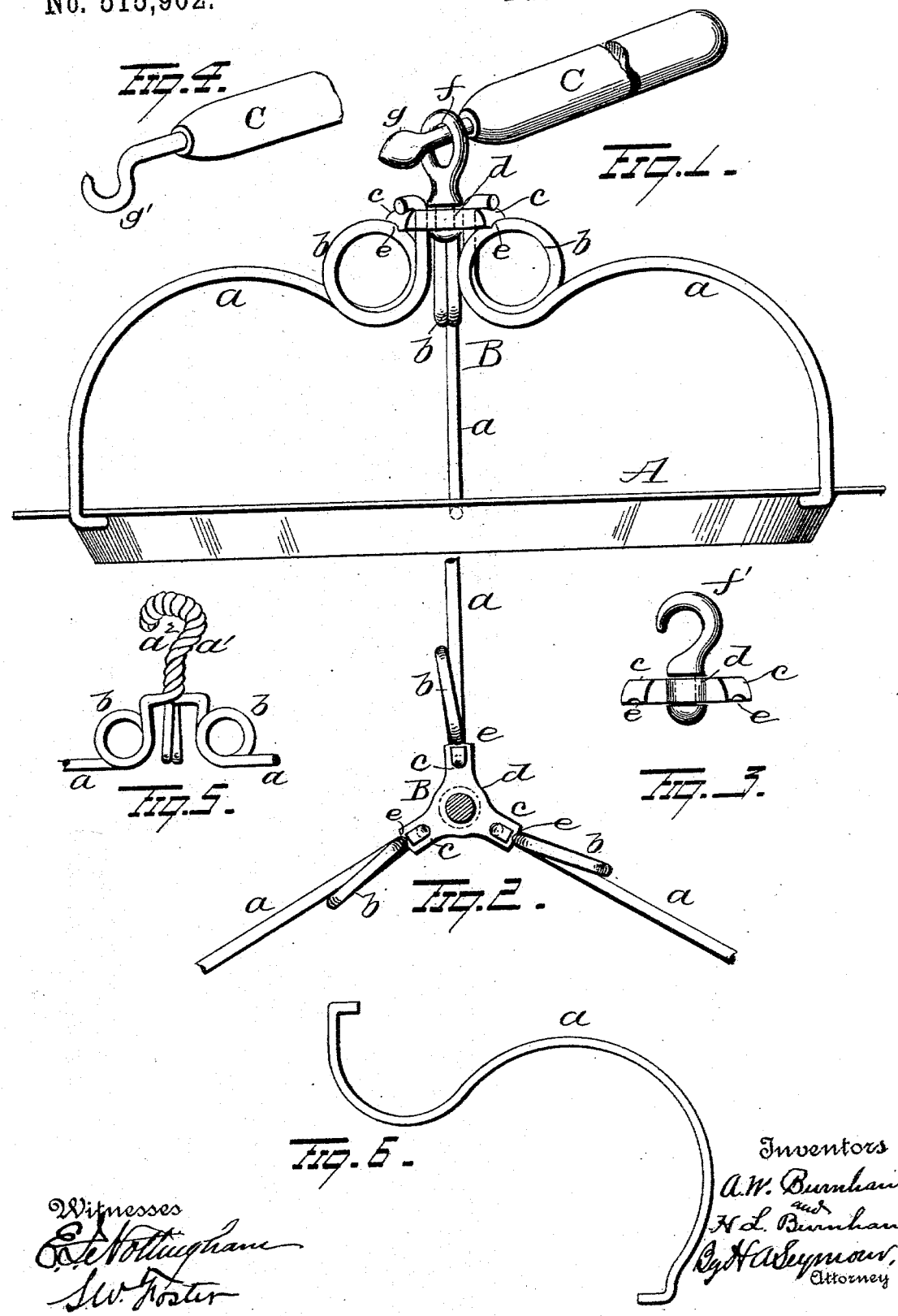

ARTHUR W. BURNHAM AND HATTIE L. BURNHAM, OF GARDINER, MAINE; SAID ARTHUR W. BURNHAM ASSIGNOR TO FRED HILDRETH, OF SAME PLACE.

PLATE-LIFTER.

SPECIFICATION forming part of Letters Patent No. 515,902, dated March 6, 1894.

Application filed October 24, 1893. Serial No. 489,012. (No model.)

*To all whom it may concern:*

Be it known that we, ARTHUR W. BURNHAM and HATTIE L. BURNHAM, residents of Gardiner, in the county of Kennebec and State of Maine, have invented certain new and useful Improvements in Plate-Lifters; and we do hereby declare the following to be a full, clear, and exact description of the invention, such as will enable others skilled in the art to which it appertains to make and use the same.

Our invention relates to an improvement in plate lifters and turners,—the object of the invention being to produce simple and cheap devices for lifting and turning a plate while in the oven,—said devices being so constructed and arranged that it will not be necessary to apply them to the plate while the latter is in the oven, and so that they can be applied to plates of various sizes.

A further object is to construct the device in such manner that it can be readily folded, whereby to facilitate its package and shipment.

With these objects in view the invention consists in certain novel features of construction and combinations and arrangements of parts as hereinafter set forth and pointed out in the claims.

In the accompanying drawings: Figure 1 is a view illustrating the application of our improvements to a plate. Fig. 2 is a detail view. Figs. 3, 4, 5 and 6 are detail views.

While we have shown the device in the drawings as applied to a tin plate, it is evident that it may also be applied to other kinds of cooking utensils.

A represents a plate, to the rim of which, a frame or bail B is connected. The frame or bail B is preferably composed of at least three arms or pieces of wire $a, a, a$, the free ends of which are so bent as to project under the rim of the plate to which the device is applied. In proximity to their upper ends, each plied. In proximity to their upper ends, each arm or wire $a$ is coiled to produce a spring $b$ and the upper extremities of said arms are pivotally connected to lugs $c$ of a plate $d$, said lugs being provided at their outer ends with notches or recesses $e$, into which the coils $b$ project, whereby to retain the arms locked in proper position when the device is in use. An eye $f$ is swiveled to the plate $d$ so that the plate held by the device can be readily turned. A rod or handle C is provided at its forward end with an enlargement $g$ adapted to enter the eye $f$, whereby to operate or handle the device. Instead of providing the handle with the enlargement $g$, said handle may be provided with a hook $g'$, as shown in Fig. 4, and instead of providing the device with an eye $f$, a hook $f'$ may be provided as shown in Fig. 3.

In using the device, a frame or bail B is applied to each plate to be used, before they are inserted into the oven and are left on the plates while they are in the oven. They may also be left on the plates after their removal from the oven. When the plates, with the bails thereon, are in the oven and it is desired to lift them for moving them or for turning, the projection on the handle will be made to engage the eye or hook on the bail and the bail and plate can be readily lifted.

In the form of the invention shown in Fig. 5, the upper or inner ends of the arms $a$ are twisted together as at $a'$ and said twisted ends are then bent in the form of a hook $a^2$. If desired the arms of the bail B may be bent sufficiently to permit them to be applied to plates of different sizes, and the coils or springs $b$ omitted as shown in Fig. 6.

Our improvements are exceedingly simple in construction, cheap to manufacture, easy to manipulate, can be folded so as to facilitate packing, and are effectual, in every respect, in the performance of their functions.

Having fully described our invention, what we claim as new, and desire to secure by Letters Patent, is—

1. A plate lifter consisting essentially of a bail composed of a series of spring arms connected together at their upper ends, the lower ends thereof being normally in position to engage the edge of a plate, and adapted to hold the plate against displacement by the action of the spring, substantially as set forth.

2. A plate lifter comprising a bail composed of a series of arms connected together at their upper ends and bent at their lower ends to form rests for the plate, the said arms being normally in position to hold a plate and coiled at points between their ends to form springs, substantially as set forth.

3. In a plate lifter the combination with a plate having notches therein, of spring arms pivotally connected to said plate and resting in the notches, substantially as and for the purpose set forth.

4. In a plate lifter, the combination with a plate, a device swiveled thereto, the said plate having an enlargement and a removable handle adapted to engage said enlargement, of a series of arms connected to said plate, substantially as set forth.

5. In a plate lifter, the combination with a plate and a device connected thereto for the reception of a handle, of lugs projecting from said plate and having recesses in their free ends, and spring arms pivotally connected to said lugs and adapted to enter said recesses, substantially as set forth.

In testimony whereof we have signed this specification in the presence of two subscribing witnesses.

ARTHUR W. BURNHAM.
HATTIE L. BURNHAM.

Witnesses:
HENRY FARRINGTON,
D. F. DANFORTH.

Affidavit having been filed showing that the name of the first-mentioned patentee in Letters Patent No. 515,902, granted March 6, 1894, for an improvement in "Plate-Lifters," should have been written and printed *Arthur M. Burnham* instead of "Arthur W. Burnham," it is hereby certified that the proper correction has been made in the files and records pertaining to the case in the Patent Office, and should be read in the Letters Patent that the same may conform thereto.

Signed, countersigned, and sealed this 3d day of April, A. D. 1894.

[SEAL.]

JNO. M. REYNOLDS,
*Assistant Secretary of the Interior,*

Countersigned:
  JOHN S. SEYMOUR,
    *Commissioner of Patents.*